Patented June 26, 1945

2,379,032

UNITED STATES PATENT OFFICE 2,379,032

PROCESS FOR THE PREPARATION OF NAPHTHALIC ACIDS

James Ogilvie, Buffalo, and Richard S. Wilder, Hamburg, N. Y., assignors to Allied Chemical & Dye Corporation, New York, N. Y., a corporation of New York No Drawing. Application July 7, 1942, Serial No. 450,076

16 Claims. (Cl. 260—523)

This invention relates to an improved process for preparing naphthalic acids and their anhydrides by oxidation of acenaphthene compounds. More specifically the invention relates to a process for oxidizing acenaphthene compounds by heating them with aqueous solutions containing a salt of chromic acid.

It has been proposed heretofore to oxidize acenaphthene to naphthalic acid by means of chromic acid or its salts, in hot aqueous sulfuric acid solution, or in acetic acid solution, specifically in glacial acetic acid, e. g. at temperatures between 80° C. and 118° C. The yields of naphthalic acid obtained by use of sulfuric acid-chromic acid mixtures are in general low (e. g. of the order of 12% to 22% of theory), while the use of chromate and acetic acid is variously reported to be no better than chromate and sulfuric acid, or to yield partial oxidation products of acenaphthene rather than naphthalic acid.

In the aforesaid procedures which employ an acid oxidizing medium, crude naphthalic acid is initially produced, together with the impurities and by-products from the reaction, in the form of an aqueous suspension, either in the reaction mixture or upon dilution thereof with water. Subsequent separation of the naphthalic acid from the accompanying by-products requires relatively inconvenient and uneconomical treatment, such as extraction with alcohol followed by sublimation; or dissolving in alkali, purifying the solution and reprecipitating with acid, sometimes preceded by extraction of the crude product, initially obtained, with mineral acid to remove insoluble chromium compounds.

We have found that acenaphthene compounds, for example unsubstituted acenaphthene, acenaphthenes containing chlorine or a sulfonic acid group as a substituent in the naphthalene nucleus, and acenaphthene derivatives in which the peri-ethylene bridge is partially oxidized, can be readily and conveniently oxidized to naphthalic acids by heating them at temperatures above about 150° C. with an alkaline to substantially neutral aqueous solution of a hexavalent chromium compound. In order to maintain these aqueous mixtures at a temperature of this order, they are heated under superatmospheric pressure. By employing an alkaline to substantially neutral solution containing basic cations which form water-soluble salts of the naphthalic acid produced, the latter remains dissolved in the reaction mixture in the form of its water-soluble salts, and insoluble chromic oxide, which is produced by reduction of the hexavalent chromium compound in the oxidizing solution, may be readily separated from the reaction mixture, together with any other water-insoluble impurities, by filtration. The naphthalic acid may then be precipitated from the filtrate by acidification with mineral acid, and separated in substantially pure form from the resulting slurry by filtering, and washing the filter cake. The naphthalic acid thus recovered can be dried at elevated temperatures, for example about 80° C. and obtained as a mixture of naphthalic acid and its anhydride; by drying at somewhat higher temperatures, for example at about 110° C., it may be obtained substantially as naphthalic anhydride.

The reaction, we have found, proceeds smoothly, necessitating a minimum of equipment and supervision, and yielding a reaction mixture from which the naphthalic acid may be recovered by a few relatively simple operations, in a sufficiently pure state to serve without further purification as an intermediate for the manufacture of dyestuffs. In the oxidation of acenaphthene to naphthalic acid according to our novel process yields of the order of 78% to 80% of theory are readily obtained.

The temperatures employed in our novel process for oxidizing acenaphthene to naphthalic acid are from about 200° C. to about 230° C. We have found that materially lower temperatures, e. g. temperatures of 190° or less, result in substantial reduction of the yields of naphthalic acid, while materially higher reaction temperatures, e. g. temperatures of 240° C. or more, cause decomposition reactions which result in contamination of the naphthalic acid and corresponding losses in yields. Preferably, temperatures from 200° to 210° C. are used, since we have found that higher temperatures, within the aforesaid suitable range, e. g., temperatures from 215° to 220° C., do not improve the yield of naphthalic acid, although the rate of the reaction may be accelerated thereby to some extent.

In general, the reaction is carried out at superatmospheric pressure above about 70 lbs. per square inch (absolute pressure) at temperatures of about 150° C. or more. The oxidation of acenaphthene to naphthalic acid is advantageously carried out in an autoclave at a pressure within the range of about 210 to about 400 lbs. per square inch. In order that the aqueous and non-aqueous phases of the mixture may be maintained in intimate contact during the reaction, the reaction mixture is preferably agitated efficiently throughout the reaction. The duration of the reaction is of the order of 15 hours.

The preferred hexavalent chromium compounds employed as oxidizing agents according to this invention are water-soluble salts of chromic acid, i. e. neutral chromates, and dichromates or other polychromates, with or without free chromic acid, the dichromates being especially preferred. Preferably the solution is alkaline, or substantially neutral. By substantially neutral solutions we mean to include aqueous solutions containing free chromic or naphthalic acids together with their salts of strong bases, such solutions having a weakly acid reaction.

The basic cations present in the aqueous oxidizing solution are preferably such that they form water-soluble salts with the naphthalic acid which is produced, so that the latter will remain in solution in the aqueous reaction mixture, permitting separation of the insoluble chromium compounds and other water-insoluble by-products from the desired product by filtration of the reaction mixture. Since alkali metal salts of naphthalic acids are relatively water-soluble, alkali metal salts of chromic acid, especially alkali metal dichromates, are preferred as oxidizing agents.

In order to insure high yields, the oxidizing agent is advantageously employed in at least stoichiometric amounts. For example, the oxidation of a molecule of acenaphthene to naphthalic acid requires theoretically $3\frac{1}{3}$ atomic equivalents of hexavalent chromium. Accordingly 3 mols of acenaphthene would require at least 5 mols of a dichromate for complete oxidation. Preferably, a slight excess of the oxidizing agent is used. For instance, we prefer to use about 2 mols of dichromate to oxidize one mol of acenaphthene. Larger proportions of hexavalent chromium, e. g. 3 mols or more of dichromate per mol of acenaphthene, may be employed, but the increase in yield of the product obtainable, thereby is relatively small.

Some of the salt of chromic acid may be replaced by an equivalent amount of free chromic acid; however, salts of chromic acid should be present in sufficient amount that their cations are at least chemically equivalent to the carboxylic acid groups produced by the oxidation reaction. In this way all of the naphthalic acid formed in the reaction mixture is present in the form of a neutral salt thereof, while otherwise, some of the naphthalic acid, which is relatively insoluble in water in the form of the free acid, may separate from the reaction mixture, together with the chromic oxide, requiring special treatment for its recovery.

The amount of water in the reaction mixture may be varied, but preferably sufficient water is employed to maintain all of the naphthalic acid salts produced dissolved in the reaction mixture. For instance, about 10 parts by weight of water for each part of acenaphthene has been found satisfactory.

Upon completion of the oxidation, the reaction mixture may be advantageously filtered to separate insoluble chromic oxide and other water-insoluble impurities therefrom, the filtrate rendered acid to Congo red by addition of mineral acid, and the naphthalic acid, precipitated thereby, recovered from the resulting slurry by filtration. Upon drying the filter cake at relatively low temperature, for instance below 50° C., the free acid may be obtained in dry form while by drying at elevated temperatures, e. g. at temperatures of the order of 80° to 100° C., some or all of the free acid is converted to the corresponding anhydride.

As indicated above, the process is applicable not only for the oxidation of acenaphthene itself but also of acenaphthenes containing substituents in the naphthalene nucleus, as well as acenaphthene derivatives in which the peri-ethylene bridge is partially oxidized. For instance, acenaphthenes containing chlorine as a substituent in the naphthalene nucleus may be oxidized with hexavalent chromium in substantially neutral or alkaline aqueous solution in a manner similar to that used for acenaphthene itself. If the acenaphthene contains a substituent which is oxidizable under the reaction conditions, for instance an alkyl group or hydroxy-alkyl group, which may be oxidized to a carboxylic acid group, the proportion of hexavalent chromium in the reaction mixture should be correspondingly increased. In oxidizing partly oxidized acenaphthene derivatives, such as acenaphthylene, acenaphthene-quinone, naphthaldehydic acid, or acenaphthenone to naphthalic acids by the procedure of the invention, correspondingly less hexavalent chromium is required. Thus, the process of the invention can be applied for the oxidation to the corresponding naphthalic acids, of acenaphthene compounds of the group consisting of unsubstituted acenaphthene and substituted acenaphthenes containing in the naphthalene nucleus a substituent of the class consisting of chlorine, and alkyl, hydroxy-alkyl and sulfonic acid groups.

In the oxidation of substituted acenaphthenes and partly oxidized acenaphthene derivatives, according to this invention, the temperatures resulting in optimum yields of corresponding naphthalic acids vary according to the nature of the acenaphthene compound oxidized. As compared with acenaphthene, in general, acenaphthene compounds which are more difficult to oxidize require relatively higher temperatures, while more easily oxidizable compounds require relatively lower temperatures for the best results. Such temperatures, however, are all above about 150° C.

The invention will be more clearly understood from the following examples in which parts are by weight and temperatures are in degrees centigrade. Since numerous variations and modifications will be apparent to those skilled in the art, it is emphasized that the details of the examples are to be interpreted as merely illustrative and not in a limiting sense.

*Example 1*

A mixture of 42 parts of acenaphthene (melting at 92° to 96°), 155 parts of sodium dichromate ($Na_2Cr_2O_7 \cdot 2H_2O$), and 415 parts of water are charged to an autoclave. The molecular ratio of dichromate to acenaphthene is about 1.9 to 1. The mixture is agitated, heated to 200°, and maintained at a temperature of 200° to 210° for about 15 hours. A gauge pressure of about 210 to about 260 lbs. per square inch is developed. The reaction mixture is then cooled to 60° to 70°, and filtered. The filter cake consisting mainly of chromic oxide, together with incompletely oxidized acenaphthene compounds, is washed with water until substantially free of sodium naphthalate. The washings are added to the filtrate and the resulting solution is rendered acid to Congo red by addition of about 55 parts of 100% sulfuric acid. Free naphthalic acid is thereby precipitated and the resulting slurry is cooled to 30° to 35°. After agitating at this temperature for 3 to 4 hours, the free acid is filtered out, washed with water until free of mineral acid, the adhering moisture displaced if desired by "blowing" the filter cake with compressed air, and the resulting product is dried at a temperature of about 100°. A dry mixture of naphthalic acid and naphthalic anhydride is thus obtained, having a melting point of 272° to 274°. The yield is about 78.5% of that theoretically obtainable from the acenaphthene originally used. The product obtained according to this example may be used without further purification as an intermediate for the manufacture of other compounds, for instance for preparing derivatives which are valuable as dyestuff intermediates.

*Example 2*

A mixture of 130 parts of 5-chlor-acenaphthene, 400 parts of sodium dichromate

and 1400 parts of water are charged to an autoclave. The molecular ratio of dichromate to 5-chlor-acenaphthene is about 1.9 to 1. The mixture is agitated, heated to 200° and maintained at a temperature of about 200° to 210° for about 15 hours. A gauge pressure of about 250 to about 330 lbs. per square inch is developed. The reaction mixture is then cooled to 60° to 70° and filtered. The filter cake is washed with warm water until the washings are substantially free of sodium chlor-naphthalic acid. The combined solution of filtrate and washings is rendered acid to Congo red by the addition thereto of 100% sulfuric acid. Free 4-chlor-naphthalic acid, precipitated thereby, is filtered from the mother liquor and is washed with cold water. The product is dried at a temperature of about 100°. The dried material is a mixture of 4-chlor-naphthalic acid and its anhydride which melts at 208° to 209°.

*Example 3*

600 parts of an aqueous solution of 5-sulfo-acenaphthene obtained by sulfonating 100 parts of acenaphthene with chloro-sulfonic acid, 75 parts of aqueous 50% caustic soda liquor and 300 parts of sodium bichromate $(Na_2Cr_2O_7 \cdot 2H_2O)$ are charged to an autoclave. The mixture is agitated, heated to 170° and maintained at a temperature of about 170° to about 180° for 15 hours. A gauge pressure of about 90 lbs. to about 125 lbs. per square inch is developed. The reaction mixture is then cooled to about 60° to about 70°, diluted with about 300 parts of water and filtered. The filter cake is washed with warm water until the washings are substantially free of sodium sulfo-naphthalic acid. The combined filtrate and washings is rendered acid to Congo red by the addition thereto of 100% sulfuric acid. 300 parts of common salt are added, and the mixture is agitated and seeded with a few crystals of sulfo-naphthalic acid to start crystallization. The mass is allowed to stand for 3 to 4 hours to complete the precipitation of product. Sodium-4-sulfo-naphthalic anhydride is separated from the mother liquor by filtration and is washed acid-free with 20% salt solution. The product is dried at a temperature of about 100°. A yield of 97 parts of sodium-4-sulfo-naphthalic anhydride is obtained thereby representing 50.4% of the theoretical amount obtainable from 100 parts of acenaphthene.

In the appended claims, the term "salt of chromic acid" is used to denote a member of the class of salts consisting of neutral chromates, dichromates, and other poly-chromates.

Variations and modifications may be made in the foregoing procedure without departing from the scope of the invention, and accordingly the invention is not limited to the procedural details hereinbefore set forth.

We claim:

1. An improved process for preparing a naphthalic acid which comprises oxidizing an acenaphthene compound of the group consisting of unsubstituted acenaphthene and substituted acenaphthenes containing in the napthalene nucleus a substituent of the class consisting of chlorine and alkyl, hydroxy-alkyl, and sulfonic acid groups, by heating said acenaphthene compound with an alkaline to substantially neutral aqueous solution of a hexavalent chromium compound, at a temperature above about 150° C.

2. An improved process for preparing a naphthalic acid which comprises oxidizing an acenaphthene compound of the group consisting of unsubstituted acenaphthene and substituted acenaphthenes containing in the napthalene nucleus a substituent of the class consisting of chlorine and alkyl, hydroxy-alkyl, and sulfonic acid groups, by heating said acenapthene compound at a temperature above about 150° C. under superatmospheric pressure with an alkaline to substantially neutral aqueous solution containing a salt of chromic acid.

3. An improved process for preparing a naphthalic acid which comprises oxidizing an acenaphthene compound of the group consisting of unsubstituted acenapthene and substituted acenaphthenes containing in the naphthalene nucleus a substituent of the class consisting of chlorine and alkyl, hydroxy-alkyl, and sulfonic acid groups, by heating said acenapthene compound at a temperature above about 150° C. under superatmospheric pressure with an alkaline to substantially neutral aqueous solution containing a salt of chromic acid, said solution containing at least sufficient hexavalent chromium to oxidize all of the acenaphthene compound to a naphthalic acid.

4. An improved process for preparing a naphthalic acid which comprises oxidizing an acenaphthene compound of the group consisting of unsubstituted acenaphthene and substituted acenaphthenes containing in the naphthalene nucleus a substituent of the class consisting of chlorine and alkyl, hydroxy-alkyl, and sulfonic acid groups, by heating said acenaphthene compound at a temperature above about 150° C. under superatmospheric pressure, with an alkaline to substantially neutral aqueous solution containing a salt of chromic acid, the cations of said solution being such as to form water-soluble salts with the naphthalic acid produced.

5. An improved process for preparing a naphthalic acid which comprises oxidizing an acenaphthene compound of the group consisting of unsubstituted acenaphthene and substituted acenaphthenes containing in the naphthalene nucleus a substituent of the class consisting of chlorine and alkyl, hydroxy-alkyl, and sulfonic acid groups, by heating said acenaphthene compound at a temperature above about 150° C. under superatmospheric pressure, with an alkaline to substantially neutral aqueous solution containing a salt of chromic acid, the cations of said solution being such as to form water-soluble salts of the naphthalic acid produced, and said solution containing at least sufficient salt of chromic acid that the cations of said salt are at least chemically equivalent to the carboxylic acid groups formed by oxidation of the acenaphthene compound.

6. An improved process for preparing a naphthalic acid, which comprises oxidizing an acenaphthene compound of the group consisting of unsubstituted acenaphthene and substituted acenaphthenes containing in the naphthalene nucleus a substituent of the class consisting of chlorine and alkyl, hydroxy-alkyl, and sulfonic acid groups, by heating said acenaphthene compound at a temperature above about 150° C. under superatmospheric pressure, with a substantially neutral aqueous solution containing an alkali metal dichromate, said alkali metal dichromate being present in sufficient amount that the alkali metal cations thereof are at least chemically equivalent to the carboxylic acid groups formed by oxidation of said acenaphthene componnd, and the hexavalent chromium of said dichromate being at least sufficient to oxidize all of the acenaphthene componnd to a naphthalic acid.

7. An improved process for preparing a naphthalic acid which comprises oxidizing an acenaphthene compound of the group consisting of unsubstituted acenaphthene and substituted acenaphthenes containing in the naphthalene nucleus a substituent of the class consisting of chlorine and alkyl, hydroxy-alkyl, and sulfonic acid groups, by heating said acenaphthene compound at a temperature above about 150° C. under superatmospheric pressure, with an alkaline to substantially neutral aqueous solution containing a salt of chromic acid, the cations of said solution being such as to form water-soluble salts of the naphthalic acid produced, separating the water-insoluble components from the reaction mixture, acidifying the resulting solution to precipitate the free naphthalic acid therefrom, and recovering the latter from the resulting slurry.

8. An improved process for preparing a naphthalic acid which comprises oxidizing an acenaphthene compound of the group consisitng of unsubstituted acenaphthene and substituted acenaphthenes containing in the naphthalene nucleus a substituent of the class consisting of chlorine and alkyl, hyroxy-alkyl, and sulfonic acid groups, by heating said acenaphthene compound at a temperature above about 150° C. under superatmospheric pressure, with a substantially neutral aqueous solution containing an alkali metal dichromate, said alkali metal dichromate being present in sufficent amount that the alkali metal cations thereof are at least chemically equivalent to the carboxylic acid groups formed by oxidation of said acenaphthene compound, and the hexavalent chromium in said solution being at least sufficient to oxidize all of the acenaphthene compound to a naphthalic acid, filtering out the water-insoluble components of the resulting reaction mixture, acidifying the filtrate to Congo red to precipitate the free naphthalic acid therefrom, and separating the free acid from the resulting slurry.

9. An improved process for preparing naphthalic acid, which comprises oxidizing acenapthene by heating it at a temperature from about 200° to about 230° C. under superatmospheric pressure, with an alkaline to substantially neutral aqueous solution, containing a salt of chromic acid.

10. An improved process for preparing naphthalic acid, which comprises oxidizing acenapthene by heating it at a temperautre from about 200° to about 230° C. under superatmospheric pressure, with an alkaline to substantially neutral aqueous solution containing a salt of chromic acid, said solution containing at least sufficient hexavalent chromium to oxidize all of the acenaphthene to naphthalic acid.

11. An improved process for preparing naphthalic acid which comprises oxidizing acenapthene by heating it at a temperature from about 200° to about 230° C. under superatmospheric pressure, with an alkaline to substantially neutral aqueous solution containing a salt of chromic acid, the cations of said solution being such as to form water-soluble salts of naphthalic acid.

12. An improved process for preparing naphthalic acid, which comprises oxidizing acenapthene by heating it at temperatures from about 200° to about 230° C. under superatmospheric pressure with an alkaline to substantially neutral aqueous solution containing a salt of chromic acid, the cations in said solution being such as to form water-soluble salts of naphthalic acid, and said salt of chromic acid being present in at least sufficient amount that the cations thereof are chemically equivalent to the carboxylic acid groups of the naphthalic acid produced.

13. An improved process for preparing naphthalic acid, which comprises oxidizing acenaphthene by heating it at a temperautre from 200° to 210° C. under superatmospheric pressure with a substantially neutral aqueous solution containing an alkali metal dichromate, said alkali metal dichromate being present in sufficient amount that the alkali metal cations thereof are at least chemically equivalent to the carboxylic acid groups of the naphthalic acid produced, and the hexavalent chromium content of said solution being at least sufficient to oxidize all of the acenaphthene to naphthalic acid.

14. An improved process for preparing naphthalic acid, which consists in oxidizing 1 mol of acenaphthene by heating it at a temperautre from 200° to 210° C. under superatmospheric pressure for about 15 hours, with an aqueous solution containing about 2 mols of an alkali metal dichromate.

15. An improved process for preparing naphthalic acid, which comprises oxidizing acenaphthene by heating it at temperatures from about 200° to about 230° C. under superatmospheric pressure, with an alkaline to substantially neutral aqueous solution containing a salt of chromic acid, the cations in said solution being such as to form water-soluble salts of naphthalic acid, and said salt of chromic acid being present in at least sufficient amounts that the cations thereof are chemically equivalent to the carboxylic acid groups of the naphthalic acid produced, separating the water-insoluble components from the reaction mixture, acidifying the resulting solution to precipitate free naphthalic acid therefrom, and recovering the latter from the resulting slurry.

16. An improved process for preparing naphthalic acid, which consists in oxidizing 1 mol of acenaphthene by heating it at a temperature from 200° to 210° C. under superatmospheric pressure for about 15 hours, with an aqueous solution containing about 2 mols of an alkali metal dichromate, filtering out the water-insoluble components of the reaction mixture, acidifying the resulting solution to Congo red to precipitate free naphthalic acid therefrom, and separating the latter from the resulting slurry.

JAMES OGILVIE.
RICHARD S. WILDER.